(12) United States Patent
Wasylciw

(10) Patent No.: US 6,641,909 B1
(45) Date of Patent: Nov. 4, 2003

(54) HEMP HURD COMPOSITE PANELS AND METHOD OF MAKING

(75) Inventor: Wayne Wasylciw, Edmonton (CA)

(73) Assignee: Alberta Research Council Inc., Edmonton (CA)

(*) Notice: Subject to any disclaimer, the term of this patent is extended or adjusted under 35 U.S.C. 154(b) by 0 days.

(21) Appl. No.: 10/031,791

(22) PCT Filed: May 18, 2000

(86) PCT No.: PCT/CA00/00574

§ 371 (c)(1),
(2), (4) Date: Jun. 11, 2002

(87) PCT Pub. No.: WO00/69607

PCT Pub. Date: Nov. 23, 2000

(30) Foreign Application Priority Data

Aug. 18, 1999 (CA) .............................................. 2272196

(51) Int. Cl.[7] .......................... B32B 9/02; B32B 31/00; B29B 9/00

(52) U.S. Cl. .................... 428/332; 428/532; 428/537.1; 428/485; 264/112; 264/115; 264/122

(58) Field of Search ................................ 264/109–128; 428/332, 532, 537.1, 485

(56) References Cited

U.S. PATENT DOCUMENTS

| | | |
|---|---|---|
| 3,567,510 A | 3/1971 | Tilby |
| 3,976,498 A | 8/1976 | Tilby et al. |
| 4,312,677 A | 1/1982 | Tilby et al. |
| 4,947,611 A | 8/1990 | Otsuka |
| 5,492,756 A | 2/1996 | Seale et al. |
| 5,498,469 A | 3/1996 | Howard et al. |
| 5,554,330 A * | 9/1996 | Flannery et al. ............ 264/113 |
| 5,908,496 A | 6/1999 | Singule et al. |
| 5,932,038 A | 8/1999 | Bach et al. |
| 5,939,209 A | 8/1999 | Shibuya et al. |
| 6,296,795 B1 * | 10/2001 | Buck ........................... 264/122 |

FOREIGN PATENT DOCUMENTS

| | | |
|---|---|---|
| CA | 2211472 | 7/1997 |
| CA | 2234889 | 4/1998 |
| CN | 1048185 | 1/1999 |
| SU | 501701 | 4/1976 |
| SU | 929027 | 5/1982 |
| SU | 1285370 | 1/1987 |
| WO | WO 93/16804 | 9/1993 |
| WO | WO 93/16805 | 9/1993 |
| WO | WO 97/45573 | 12/1997 |

OTHER PUBLICATIONS

Sellers, Terry, Jr., et al. "Use of Kenaf Core for Panel Products", Conference Mar. 21–23/1996, Albuquerque, New Mexico.

Sellers, Terry, Jr., et al. "Lignocellulosic–Based Composites Made of Core From Kenaf, An Annual Agricultural Crop" Paper—IUFRO XX World congress Aug. 6–12/1995, Tampere, Finland.

Webber, Charles "Yield Components of Five Kenaf Cultivars" Paper, Agronomy Journal, vol. 85, No. 3 pp. 533–535.

Webber, Charles "Introduction to Kenaf", Paper.

White, et al., "Cultural and Harvesting Methods for Kenaf . . . An Annual Crop Source of Pulp in the Southeast", Production Research Report No. 113, U.S. Department of Agriculture, Apr. 1970, pp. 1–35.

Chow, et al. "Oriented Kenaf Strandboard Performance", Paper, Conference Mar. 21–23, 1996 Albuquerque, New Mexico.

* cited by examiner

Primary Examiner—Stephen J. Lechert, Jr.
(74) Attorney, Agent, or Firm—Bennett Jones LLP

(57) ABSTRACT

A method of forming a structural member from hemp hurd and the structural member produced which is substantially free of hemp bats fibers is made by providing hemp stalks which have been decorticated and hurd material is divided into hurd strands which are then mixed with a binder and then pressed into a structural member. The hemp hurd strands can be mixed with wood strands to form wood/hurd structural members.

24 Claims, 3 Drawing Sheets

HEMP HURD COMPOSITE PANELS AND METHOD OF MAKING

This application claims benefit under 35 U.S.C. 371 of PCT/CA00/00574 filed May 18, 2000.

FIELD OF THE INVENTION

The present invention relates to composite structural members such as panels, boards or beams which comprise hemp hurds.

BACKGROUND OF THE INVENTION

Industrial hemp is a bast fibre plant similar to flax. Bast plants produce two types of fibres. The outer bast fibres run longitudinally along the perimeter of the stalk. Bast fibres are very strong in tension and are typically used in textile manufacture, cordage and specialty papers. Hemp bast fibres have also been used in medium density fibreboard.

There is significant interest in producing non-wood lignocellulosic structural building material, particularly with a view to forest conservation and the utilization of a waste material. For example, cereal straw has been successfully incorporated into an oriented strand board ("OSB") with strength characteristics which are similar to or better than wood OSB of similar thickness. A description of a method and apparatus of fabricating a cereal straw panel may be found in co-owned U.S. Pat. No. 5,932,038.

A significant portion of a hemp plant is the hurd, which is the core fibrous material in the stalk. The hurd has been dismissed as a potential structural material due to its short fibre length and its low density. It is only marginally suited for paper production. In hemp processing, it is considered a waste product with limited value mainly as an absorptive material. This is unfortunate because the hurd may make up 70 to 75% of the hemp plant stalk mass.

It is known to use hemp hurd material with a cementitious binder to make a bulk material that may be handled in a similar manner to cement in that it may be poured into a mould or troweled onto a surface. However, there is no disclosure in the prior art that teaches the use of hemp hurd fibre in a structural member such as a board, a panel or a beam.

SUMMARY OF THE INVENTION

The present invention is directed to methods of producing structural members comprising hemp hurd fibres and to such structural members themselves.

Accordingly, in one aspect of the invention, the invention comprises a method of forming a structural member comprising the steps of:

(a) processing a hemp plant to produce hurd which is substantially free of bast fibres;
(b) splitting the hurd longitudinally to produce hurd strands;
(c) adding binder to the hurd stands; and
(d) pressing the hurd strands into a desired shape and allowing the binder to set.

The hurd strands may comprise substantially elongate strands having a length greater than about 20 millimeters and aspect and slenderness ratios greater than about 3:1. Shorter strands having aspect and slenderness ratios as low as about 1:1 may have an application in producing thin-stiff panels of limited bending strength. The structural member may be a board, a panel or a beam.

The method may further comprise the step of orienting a majority of the hurd strands such that the hurd fibres are substantially parallel in the structural member. In one embodiment which emphasizes structural strength, the hurd strands may be pressed such that the structural density is greater than about 500 kilograms per cubic meter. In another embodiment which emphasizes insulative and sound absorptive properties, the hurd strands may be pressed such that the structural member density is less than about 350 kilograms per cubic meter.

In one embodiment, the hurd strands may be mixed with wood strands to produce a composite wood/hurd structural member.

In another aspect of the invention, the invention comprises a structural member comprising oriented hemp hurd strands and a resin wherein said member is substantially free of hemp bast strands.

BRIEF DESCRIPTION OF THE DRAWINGS

The invention will now be described by way of exemplary embodiments with reference to the accompanying drawings in which.

DETAILED DESCRIPTION OF THE INVENTION

Figure 1:
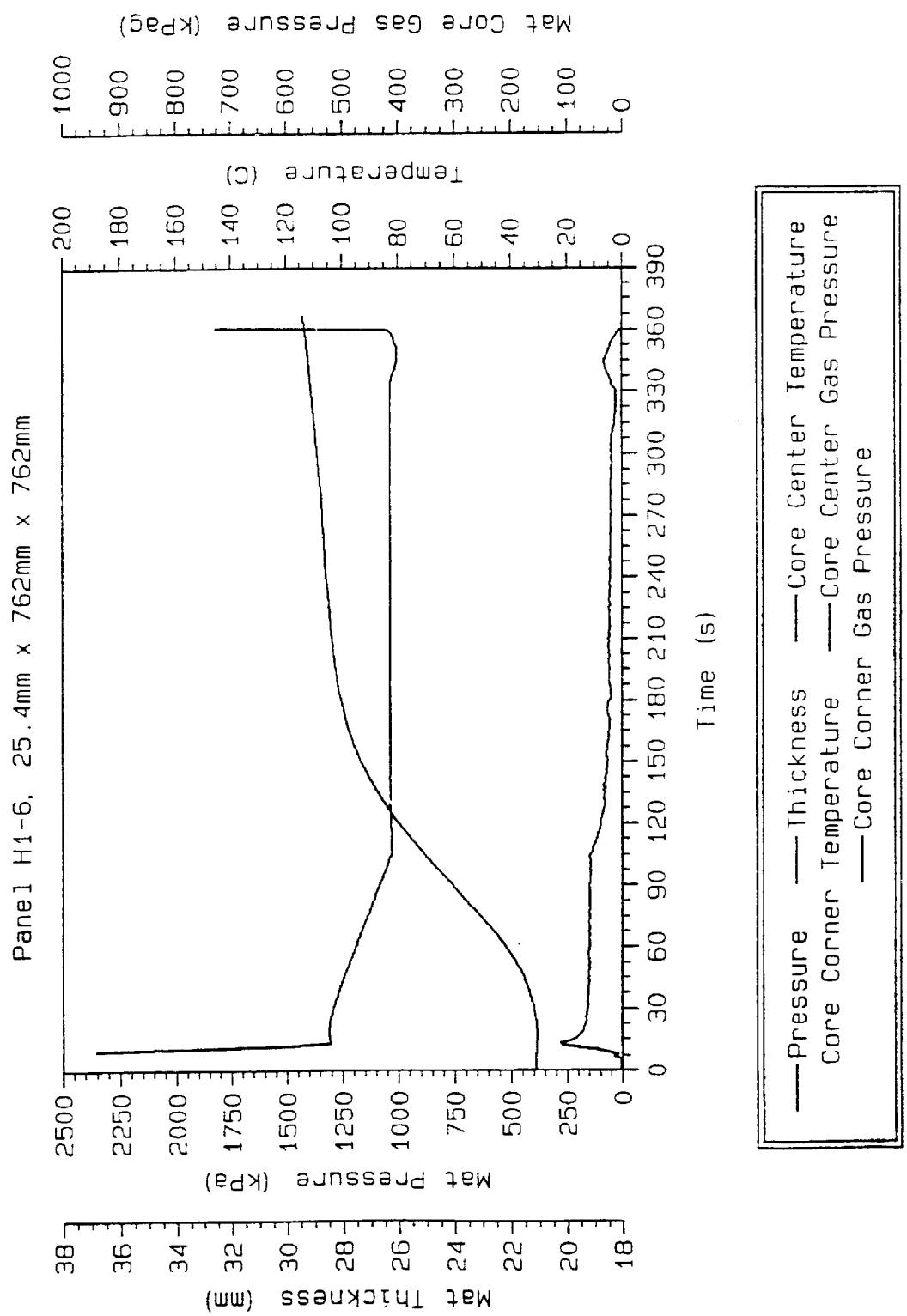
FIG. 1 is a graphical representation of a pressing cycle used in one embodiment of the present invention.

The present invention provides for a structural member comprising hemp hurd fibres bound together by a resin as well as a method of producing such structural members. When describing the present invention, the following terms have the following meanings, unless indicated otherwise. All terms not defined herein have their common art-recognized meanings.

A. Definitions

The term "hurd" refers to the inner fibrous core of the hemp plant which may be separated from the cortical bast fibres of the hemp plant.

The term "bast" refers to fibres of the cortical bark of the hemp plant.

The term "oriented" refers to positioning of the strands which form the structural members of the present invention such that the majority of the fibres are substantially parallel to each other.

The term "strand" or "strands" refers to a bundle of elementary fibres wherein the length to width ratio (aspect ratio) and the length to thickness ratio (slenderness ratio) are both greater than about 1:1 and preferably greater than about 3:1.

The term "structural member" refers to a member formed by the methods of the present invention which maintains its structural shape and integrity. It is not intended to restrict the definition of structural member as used herein to members which meet or exceed certain standards to be used in structural or building applications. Therefore, "structural member" may include lightweight, low-density members which, by themselves, are unsuitable for load bearing, applications.

The term "substantially free of bast fibres" refers to hurd material which contains less than about 15% bast fibres by weight, preferably less than about 5% bast fibres by weight and more preferably less than about 2% bast fibres by weight.

B. Description

In one aspect of the invention, a method for producing a structural member such as a panel, board or beam is provided. Hemp stalks are processed to separate the hurd from the bast fibres and to produce hurd pieces in a process referred to herein as decortication. As used herein, decortication shall refer to a process of separating the outer fibrous bark or bast of a hemp plant from its hurd. This process may be done manually by stripping or peeling the bast fibres away from the hurd. Preferably, decortication is automated using machines and methods designed to decorticate a hemp plant or adapted from machines and methods used to decorticate sugarcane or flax.

In one embodiment, coarse hurd may be separated from bast fibre by hammer milling hemp stalks through a coarse screen. The size of the screen may be varied to vary the size of the hurd obtained. In one preferred embodiment, the screen may be a 38 mm screen. The hurd/bast fibre mixture is then screened to separate the two constituents. Coarse hurd produced in this manner may have an average length of about 20 to about 25 mm. Coarse hurd material may be further screened and/or hammer milled to produce finer hurd material if desired.

Longer hurd strands may be produced by stripping the hurd from whole hemp stalks which have been pressed and split. Hurd strands greater than about 25 mm in length may be produced in this manner. In this instance, the hurd should be split longitudinally to produce long, slender and narrow strands.

One example of a decortication machine is disclosed in PCT application WO 97/45573 by Australian Hemp Company Limited. The apparatus includes bond rupture rollers to facilitate the rupture of the bonds between the fibre and the hurd, counter-rotating pressing rollers which flatten the stalk. The stalk is then split longitudinally and processed over decorticating rollers which include a vacuum roller and a toothed roller which cooperate to strip the hurd from the fibre. Sugarcane separators such as those disclosed in U.S. Pat. Nos. 3,567,510, 3,976,498 and 4,312,677 may also be used with minor modifications to handle hemp stalks. Numerous other alternatives are known to those skilled in the art.

An alternative decorticating technique may be used to produce hurd strands having a length less than about 30 mm. Hemp stalks may be fed through interlocking rollers having flat-topped teeth. The root and land of each roller tooth may be approximately 1 cm each. The result is a corrugated bark material where the hurds have been separated from the bark. The hurd material ranges in size from 30 mm long strands to a fine particulate consistency. Larger hurd material may result if larger roller teeth are provided on the interlocking rollers.

In one embodiment, the hurd material is cut or produced into strands having a nominal length of 20 mm or longer, preferably in the range of greater than about 50 mm and more preferably in the range of about 100 mm. In another embodiment, the hurd pieces are cut or produced into strands having a nominal length of less than 20 mm. The longer strands are more suitable for end product members that are intended to be high density structural members although their use is not restricted to such high density products. The shorter strands are more suitable for low density panels or boards having thermal resistivity and/or acoustical absorption properties while retaining some structural strength although their use is not restricted to such low density products.

Hurd material or strands may be split longitudinally to achieve desired slenderness and aspect ratios. Preferably, both slenderness and aspect ratios should exceed 3:1, particularly where bending strength is a desired property of the structural member.

The hurd strands should have a moisture content in the range of about 5% to about 25%. If the moisture content is greater, the hurd strands should be dried prior to blending with the resin. If the moisture content is too low, it may be preferable to introduce some moisture to the strands before blending with the resin.

The hurd strands are then blended with a resin binder which will bind the strands together in the end product. Blending machines for wood OSB are well known in the art and are used with the present invention with no or little modification. Rotary blenders with a spinning disc atomiser are representative of a suitable apparatus. What is necessary is that the resin be evenly distributed with the hurd strands to maximize internal bonding when the strands are later pressed and the resin cured. Preferred resins include isocyanate resins such as diphenylmethyldiisocyanate ("MDI"). Also suitable, but less preferred, are phenolic resins typically used for wood OSB products or urea formaldehyde resins used in particleboard. The hurd strands are compatible with any resin typically used in lignocellulosic composite panels.

As well, a suitable wax may be added with the resin to improve the efficiency of the resin and enhance resistance to moisture and water absorption. Suitable waxes may include slack wax, emulsified wax or powdered wax, as is well known in the art. The wax may be added in the range of about 0.5% to about 1.5% or more. Increasing the wax component beyond this range is possible but does not improve performance nor does it have any substantially deleterious effect.

In one embodiment, the hurd strands may then be oriented such that the strands are substantially parallel. Strand orientation may be achieved with minor modification to machines and methods used for orienting wood strands for OSB or cereal straw, which are well known in the art. In one example, strand orientation is accomplished using a mat orienter which includes a plurality of spinning discs. In one example, the pieces may be vibrated on a corrugated panel before being pressed. The corrugations will cause the hurd strands to align. In another example, the hurd strands may be dropped on parallel-aligned vertical bars placed in the form of a spaced grid with a width that is less than the strand length. Vibrating or shaking the strands on the grid will cause the strands to fall through and be substantially oriented in one direction. Layers having cross-orientation may be produced where the strand orientation in one layer is oriented perpendicular to the strand orientation in other layers in order to facilitate stiffness and strength both parallel and perpendicular to machine manufacturing direction. For example, a structural panel may have a core and two face layers where the orientation of the strands in the core layer is perpendicular to the orientation of the strands in the face layers.

The mats formed by the oriented hurd strands are then pressed to compact and consolidate the mat and raise its internal temperature high enough to cure the resin in a reasonable period of time. The time and temperature parameters may vary according to the resin used. In one embodiment, the temperature may reach between about 175° C. to about 235° C. and the resin will cure within about 3 to about 5 minutes. Pressing may be monitored and controlled using well-known or commercially available systems such as the PressMAN™ press monitoring system manufactured by Alberta Research Council, Edmonton, Alberta, Canada.

In one embodiment, hurd strands may be mixed with wood strands used in conventional wood OSB manufacturing to produce wood/hurd composite OSB structural members. The methods involved in producing such composite members may be as described herein or may be essentially those used in conventional wood OSB panel production which are well known in the art. Alternatively, the hurd strands may be mixed with other lignocellulosic strands such as straw or flax to produce composite structural members using the methods described herein or similar methods. Methods of producing oriented strand structural members using lignocellulosic material such as wood or straw are well known in the art. A person skilled in the art may have reference to various prior art references such as U.S. Pat. No. 5,932,038 entitled "Method of Fabricating a Straw Panel, Board or Beam" or Maloney, T. M., 1993. Modern Particleboard & Dry-Process Manufacturing, Updated Edition, Miller Freeman Publications, San Francisco, Calif., the contents of which are incorporated herein by reference.

In a preferred embodiment, the structural member is a panel which is formed from three layers; two outer or face layers and a core layer. The core layer may be comprised entirely of oriented hurd strands or a mixture of oriented wood and hurd strands while the outer layers are comprised entirely of wood strands.

EXAMPLES

The following examples are provided to illustrate the present invention, not to limit the invention claimed herein. Hurd strand panels and wood/hurd composite panels were manufactured as follows:

TABLE 1

Description of Manufacturing Parameters for each Panel Type

| Panel Type | Group I.D. | Thickness (mm) | Density (kg/m$^3$) | Resin Content Face | Resin Content Core | Mat Construction |
|---|---|---|---|---|---|---|
| Hurd (High Density — Long Strand) | HS 1 | 11.1 | 640 | 4% MDI | 4% MDI | Panels oriented 60% face, 40% core |
|  | HS 2 | 11.1 | 608 | 4% MDI | 4% MDI |  |
|  | HS 3 | 11.1 | 576 | 4% MDI | 4% MDI |  |
| Hurd (Low Density — Short Strand) | HI 1,2 | 25.4 | 320 | 4% MDI | 4% MDI | Random homogenous panel |
|  | HI 3,4 | 25.4 | 240 | 4% MDI | 4% MDI |  |
|  | HI 5,6 | 25.4 | 160 | 4% MDI | 4% MDI |  |
| Wood Hurd Mixtures | WH 0 | 11.1 | 640 | 4% MDI | 4% MDI | Oriented-no hurds |
|  | WH 1 | 11.1 | 640 | 4% MDI | 4% MDI | 15% hurds in core |
|  | WH 2 | 11.1 | 640 | 4% MDI | 4% MDI | 25% hurds in core |
|  | WH 3 | 11.1 | 640 | 4% MDI | 4% MDI | 35% hurds in core |

The panels designated HS 1, 2 and 3 were produced from hurd strands having nominal dimensions of about 10 mm wide 100 mm long and 5 mm or less thick. The panels designated HI 1 to 6 and the wood/hurd mixture panels designated WH 0 to 3 were produced from hurd strands having a nominal length of about 15 to about 20 mm. In all cases, slack wax in the amount of 1% was added along with the resin. The panels were pressed with pressing cycles adapted from typical wood OSB pressing cycles.

Example 1

The high density, long strand panels were tested for modulus of rupture (MOR), modulus of elasticity (MOE), internal bonding (IB) and thickness swell. The results are compared with CSA standard 0437 "02" in the following table:

TABLE 2

Physical Properties of HS panels.

| Property | CSA 0437 "02" | HS 1 | HS 2 | HS 3 |
|---|---|---|---|---|
| MOR (Mpa) | 29.0 | 36.3 | 32.6 | 29.9 |
| MOE (Mpa) | 5500 | 5700 | 6550 | 5550 |
| IB (Mpa) | 0.345 | 0.733 | 0.524 | 0.524 |
| Thickness Swell (MPa) | 15.0 | 17.5 | 22.9 | 22.0 |

As may be seen, the hurd panels meet or exceed each of the CSA standards for each of the properties measured except for thickness swell.

Example 2

Low density hurd panels were formed as above using a pressing cycle as shown in FIG. 1. The low density hurd panels HI 1–6 did not have the physical strength to meet any structural panel requirements. However, these panels were lightweight and maintained their integrity, leading to the conclusion that they were useful for insulating and sound absorption properties.

The thermal resistivity of these panels was measured and compared with fibreglass batts and loosefill hurd fibres (Canbiote™) and the results shown in the following table:

TABLE 3

Thermal Resistivity of Hurd Insulation Panels

| Material* |  | Density (kg/m$^3$) | R Value (per 25 mm) |
|---|---|---|---|
| Insulation (high density) | HI 1, 2 | 320 | 2.1 |
| Insulation (medium density) | HI 3, 4 | 240 | 2.3 |
| Insulation (low density) | HI 5, 6 | 160 | 2.7 |
| Fiberglass |  | 160 | 3.2 |
| Loose-fill Hurd |  | 150 | 1.8 |

*R Values for all hurd panel types at each density were averaged.

Figure 3:
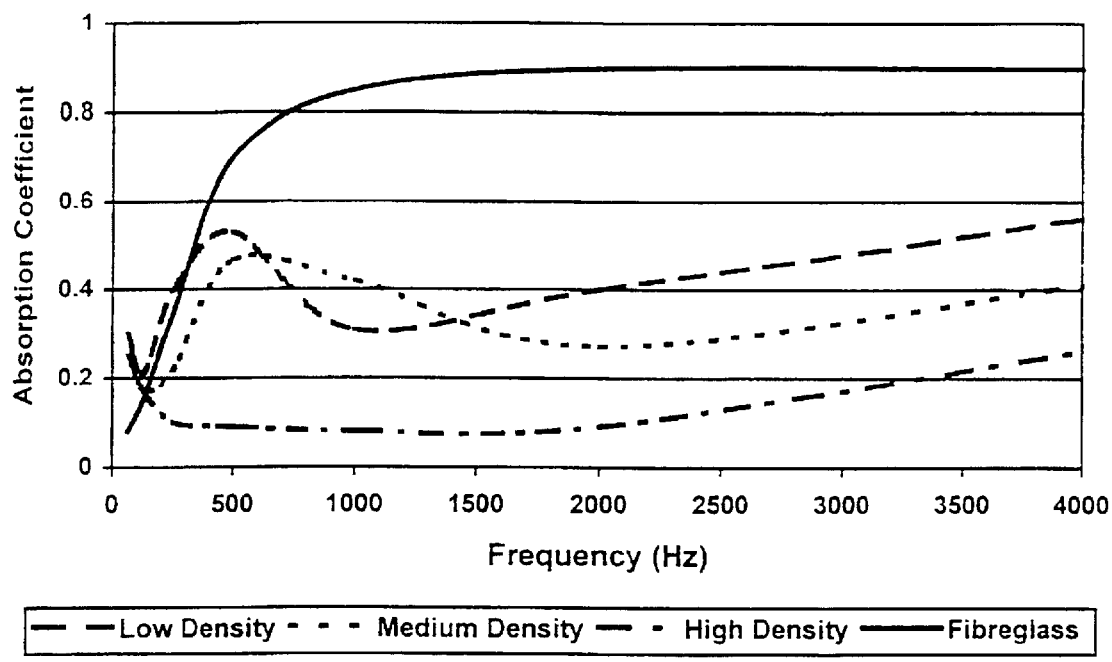
FIG. 3 shows the sound absorptive properties of structural members according to one embodiment of the invention.

As well, the acoustical performance of these hurd panels was measure and compared with fibreglass batts. The results are shown graphically in FIG. 3. The hurd panels show reasonable sound absorption but not as good as fibreglass.

Example 3

Figure 2:
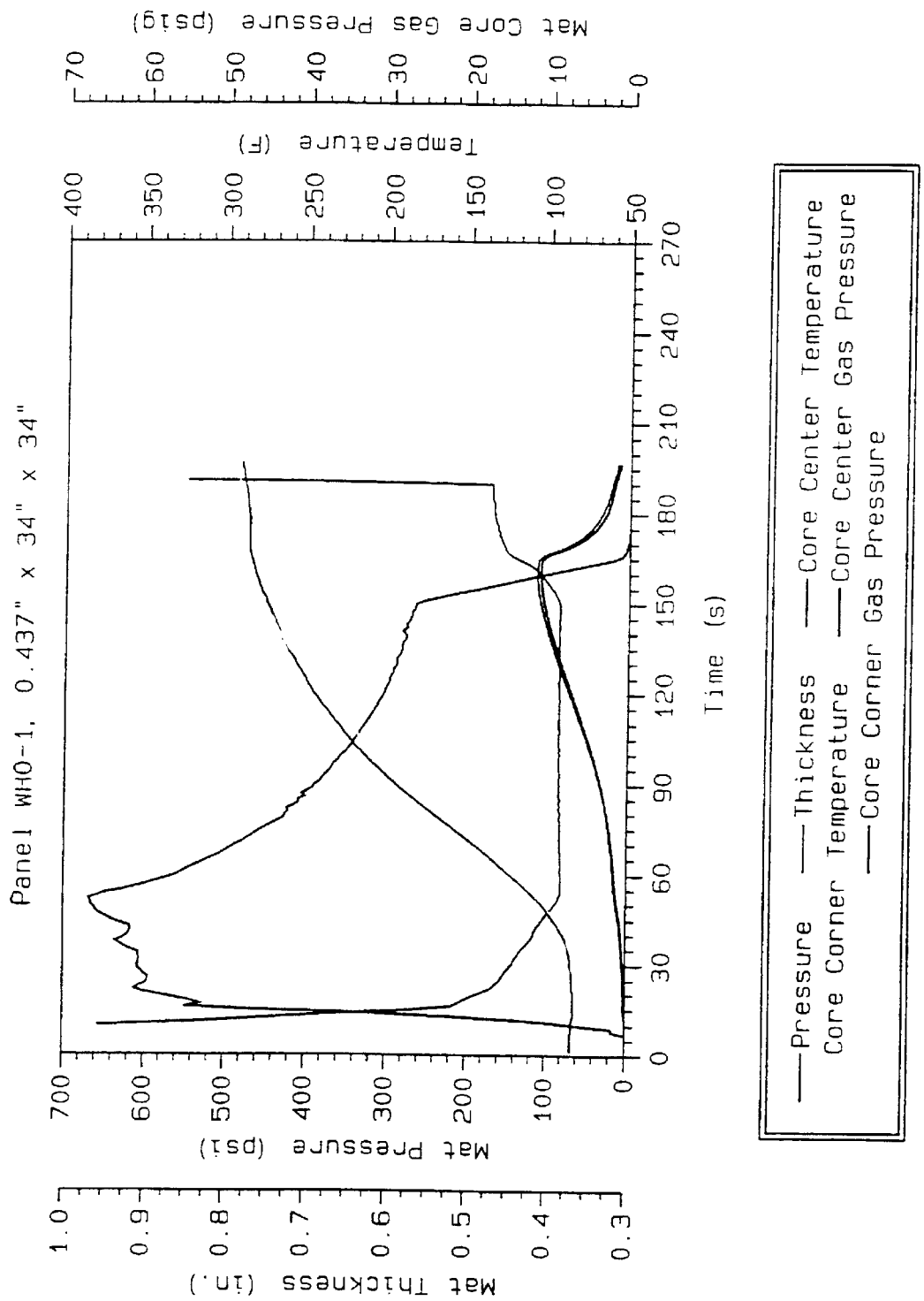
FIG. 2 is a graphical representation of a pressing cycle used in one embodiment of the present invention.

Wood/hurd panels WH 0, 1, 2 and 3 were formed using the pressing cycle shown in FIG. 2 and tested for the same physical properties as in Example 1 and further including the 2 hour boil test and linear expansion test (oven dried vacuum pressure soak). The results were compared again with CSA standard 0437 "02" and were as follows:

TABLE 4

Physical Properties of Wood-Hurd Panel Mixtures

| Property | CSA 0437 "02" "perp" only | WH 0 (no hurds) | WH 1 (15% hurds) | WH 2 (25% hurds) | WH 3 (35% hurds) |
|---|---|---|---|---|---|
| MOR (MPa) | 29.0 | 64.0 | 52.3 | 48.3 | 54.2 |
| MOE (MPa) | 5500 | 9767 | 9100 | 8900 | 9333 |
| IB (MPa) | 0.345 | 1.096 | 0.799 | 0.728 | 0.655 |
| T.S. (%) | 15.0 | 8.9 | 9.5 | 9.9 | 9.6 |
| 2 hr Boil (Mpa) | 14.5 | 28.9 | 28.9 | 24.0 | 27.6 |
| LE (ODVPS) (%) | 0.35 | 0.16 | 0.19 | 0.22 | 0.22 |

As well, these panels were produced with shorter hurd strands with very little aspect or slenderness ratios close to unity. It is reasonable to conclude that wood/hurd panels using longer hurd strands such as those used in panels HS 1–3 would result in stronger composite panels, closer to that of an all-wood panel.

As will be apparent to those skilled in the art, various modifications, adaptations and variations of the foregoing specific disclosure can be made without departing from the scope of the invention as defined by the appended claims.

What is claimed is:

1. A method of forming a structural member comprising the steps of:
   (a) processing a hemp plant to produce hurds which are substantially free of bast fibres;
   (b) splitting the hurds longitudinally to produce hurd strands;
   (c) adding binder to the hurds;
   (d) orienting a majority of the hurd strands such that the hurd fibres are substantially parallel in the structural member; and
   (d) pressing the hurds into a desired shape and allowing the binder to set.

2. The method of claim 1 wherein the hurds are substantially elongate strands having a length greater than about 20 millimeters and slenderness and aspect ratios greater than 3:1.

3. The method of claim 1 wherein the structural member comprises two or more layers wherein the hurd strands are oriented in each layer and the direction of orientation in one layer is perpendicular to the direction of orientation in the other layer.

4. The method of claim 1 wherein the structural member is a board.

5. The method of claim 1 wherein the structural member is a panel.

6. The method of claim 1 wherein the structural member is a beam.

7. The method of claim 1 wherein the structural member density is greater than about 500 kilograms per cubic meter.

8. The method of claim 1 wherein the hurd stands have a length of less than about 20 millimeters.

9. The method of claim 1 wherein the structural member density is less than about 350 kilograms per cubic meter.

10. The method of claim 1 wherein the binder is an isocyanate resin.

11. The method of claim 1 wherein the isocyanate resin is diphenylmethyldiisocyanate.

12. The method of claim 1 wherein the structural member also comprises wood strands.

13. A structural member comprising oriented hemp hurd strands and a binder wherein said member is substantially free of hemp bast strands.

14. The structural member of claim 13 which is a board.

15. The structural member of claim 13 which is a panel.

16. The structural member of claim 13 which is a beam.

17. The structural member of claim 13 wherein the binder is an isocyanate resin.

18. The structural member of claim 17 wherein the isocyanate resin is diphenylmethyldiisocyanate.

19. The structural member of claim 13 further comprising wood strands.

20. The structural member of claim 13 wherein the structural member comprises three layers of oriented strands wherein the outer layers comprise wood strands substantially free of hurd strands and the core layer comprises hurd strands.

21. The structural member of claim 20 wherein the core layer comprises hurd strands up to about 50% by weight and wood strands making up the remainder.

22. The structural member of claim 21 wherein the strand orientation in the core layer is perpendicular to the strand orientation in the outer layers.

23. The structural member of claim 13 wherein the hurd strands have a length greater than about 20 mm and slenderness and aspect ratios greater than about 3:1.

24. The structural member of claim 13 wherein the hurd strands have a length less than about 20 mm.

* * * * *